United States Patent Office 3,201,416
Patented Aug. 17, 1965

3,201,416
SIMPLIFIED PROCESS FOR THE PREPARATION OF ETHYLENE MONOTHIOLCARBONATE
Dee Lynn Johnson and Delbert Daniel Reynolds, Rochester, N.Y., assignors to Eastman Kodak Company, Rochester, N.Y., a corporation of New Jersey
No Drawing. Filed Aug. 8, 1962, Ser. No. 215,535
12 Claims. (Cl. 260—327)

This invention relates to the production of ethylene monothiolcarbonate by a novel and improved method.

The preparation of ethylene monothiolcarbonate (I)

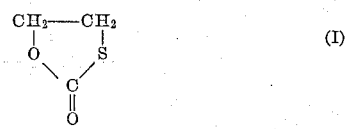

(I)

has been described by D. D. Reynolds in the Journal of the American Chemical Society, 79, 4951 (1957). This process comprises reacting 2-mercaptoethanol with phosgene in the presence of pyridine employing ethyl acetate as the reaction medium. While this process does provide a means for preparing ethylene monothiolcarbonate (I), considerable polymer is formed as a by-product and thorough removal of pyridine and pyridine hydrocholride is necessary to avoid decomposition of the ethylene monothiolcarbonate in the step in which the ethyl acetate is removed. Consequently, the reported yield of ethylene monothiolcarbonate is only 48.1%.

Subsequently, it was discovered that under the acidic influence or organic sulfonic acids, alkyl 2-hydroxyethylthiolcarbonates readily undergo an intramolecular transesterification to give ethylene monothiolcarbonate (I), polyethylene sulfide and dithiane as by-products (D. D. Reynolds, D. L. Fields, and D. L. Johnson, J. Org. Chem. 26, 5122 (1961). However, this process requires trituration and filtration to remove the polymer, neutralization, acidification and finally, distillation of ethylene monothiolcarbonate (I).

We have now found that ethylene monothiolcarbonate (I) may be obtained by simple distillation from one flask in which an alkyl or aryl 2-hydroxyethylthiolcarbonate (II) or alkyl or aryl 2-mercaptoethylcarbonate (IV) has been refluxed with a metal salt catalyst hereinafter described.

One object of this invention is to provide a new and improved method for preparing ethylene monothiolcarbonate (I). Another object is to provide a more economical process for the preparation of ethylene monothiolcarbonate (I). Other objects will become apparent from a consideration of the description and claims.

The objects of this invention may be obtained by refluxing an alkyl or aryl 2-hydroxyethylthiolcarbonate (II) or an alkyl or aryl-2-mercaptoethylcarbonate with a catalytic amount of a metal salt catalyst of the formula $M_aY_b$ wherein M is chosen from the group comprising aluminum, the metals of group IIIB and IVB of the periodic table, Fundamental Chemistry, 2nd edition, by H. G. Deming, John Wiley & Son, Inc., the lanthanides and the actinides, and Y is chosen from the group comprising acetate, alkoxide, halide or nitrate, and $a$ and $b$ are integers corresponding to balanced valences. The formula $M_aY_b$ also includes mixed radicals and the so-called "basic" and "-yl" salts, e.g. basic aluminum acetate and uranyl nitrate. Alkaline earth salts are effective catalysts with aromatic 2-hydroxyethylthiolcarbonate when the acidic phenol evolved suppresses the decomposition of the ethylene monothiolcarbonate (I) produced.

In our preferred embodiment, the reaction is carried out under reduced pressure, but this is not required.

An overall reaction scheme is suggested below:

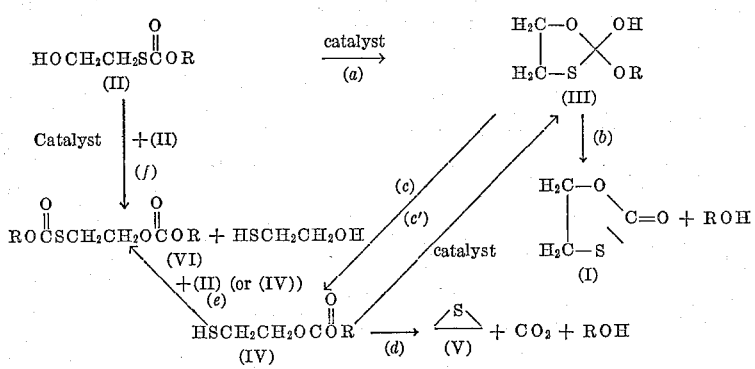

The hydrocarbon radical identified above as R may be alkyl, including cycloalkyl such as cyclohexyl, etc. having 1–6 carbon atoms and aryl radicals such as phenyl, tolyl, xylyl, etc., including aralkyl such as benzyl, etc. The aryl radical may be substituted with such radicals as halogen, ether, hydroxy methyl, etc.

In step $a$, II in the presence of the cataylst undergoes an intramolecular transesterification to form intermediate III which can follow path $b$ with the loss of alcohol (including phenol) to give the stable I, or path $c$ with carbon sulfur scission to the alkyl or aryl 2-mercaptoethylcarbonate (IV). IV can revert by path $c'$, to regenerate III, which again can follow path $b$ or $c$, or IV by path $d$ can intramolecularly displace ethylene sulfide (V), carbon dioxide and alcohol, all of which are volatilized by the reaction conditions. Eventually II and IV will be converted to I or V and carbon dioxide and alcohol leaving only I in the distillation flask. With some cataylsts intermolecular transesterification, path $e$ and $f$, constitutes a minor percent of the reaction course with 2-mercaptoethanol evolved giving rise to the alkyl or aryl 2-(alkyl or aryl thiolcarbonate) ethyl carbonate (VI), a high-boiling residue. Illustrative of the reversibility of path $c'$ is Example 15 in which pure IV was converted to I in 93.5 percent yield.

Example 1

Ethyl 2-hydroxyethylthiolcarbonate, 1500 g. (10 mole), (purchased from Eastman Organic Chemicals, Chemical No. 8310) and exactly 0.25 g. of aluminum acetate (Baker and Adamson, No. 1224), are charged to a 2-l. flask equipped with a thermometer, magnetic stirring-bar and an 8-inch Vigreux column topped with a 10-inch coil condenser. The system is placed under aspirator vacuum (ca. 10 mm.) and heated to reflux. The refluxing is continued for about 24 hours, as the volume of the liquid reduces and the refractive index of the pot rises to about $n_D^{25}$ 1.5030. At this time, the column and condenser are replaced with a 14-inch glass-helices-packed column and a variable-reflux ratio-distillation head.

Vacuum distillation gives 861–877 grams (82–84 percent) ethylene monothiolcarbonate (I), B.P. 98°/8 mm. Hg, $n_D^{25}$ 1.5102.

*Example 2*

Methyl 2-hydroxyethylthiolcarbonate (prepared by the general procedure of D. D. Reynolds, D. L. Fields and D. L. Johnson, J. Org. Chem., 26, 5119 (1961) ), 390 g. (3 moles) and 0.05 g. of aluminum acetate (Baker and Adamson No. 1224), are placed in a 1-l. flask with an 8-inch Vigreux column and a 10-inch coil condenser. The system is evacuated and heated to reflux for 18 hours, at which time distillation is effected through a 14-inch glass-helices-packed column. 258 g. (83 percent) of I was obtained.

*Example 3* n-Hexyl 2-hydroxyethylthiolcarbonate (prepared by the general method of D. D. Reynolds, D. L. Fields and D. L. Johnson, J. Org. Chem., 26, 5119 (1961), 130 g. (0.63 mole) and 0.025 g. of aluminum acetate (Baker and Adamson No. 1224) in a 500 ml. flask, were refluxed under aspirator vacuum for 72 hours. Distillation through a 14-inch glass-helices-packed column gave 21 g. (31.5 percent) of I.

*Example 4*

Aluminum isopropoxide (Eastman Organic Chemical P–4101) 0.04 g. and 300 g. (2 moles) of ethyl 2-hydroxyethylthiolcarbonate were refluxed under aspirator vacuum for 26 hours. Distillation gave 157 g. (76 percent) of I.

*Example 5*

Aluminum chloride (Baker and Adamson No. 1228), 0.06 g. and 300 g. of ethyl 2-hydroxyethylthiolcarbonate were refluxed under aspirator vacuum for 48 hours. Distillation gave 123 g. (60 percent) of I.

*Example 6*

Aluminum bromide 0.2 g. (Fischer Scientific Co. No. A–570) and 300 g. (2.0 moles) of ethyl 2-hydroxyethylthiolcarbonate were refluxed under aspirator vacuum for 6 hours. Distillation gave 176 g. (84 percent) of I.

*Example 7*

Aluminum nitrate 0.10 g. (Baker and Adamson No. 1235), and 300 g. (2.0 moles) of ethyl 2-hydroxyethylthiolcarbonate were refluxed under aspirator vacuum for 108 hours. Distillation gave 166 g. (79 percent) of I.

*Example 8*

Titanium isopropoxide, 0.56 g. and 300 g. (2.0 moles) of ethyl 2-hydroxyethylthiolcarbonate were refluxed for 30 hours under aspirator vacuum. Distillation gave 153 g. (73 percent) of I.

*Example 9*

Uranyl nitrate, 0.01 g., and 300 g. of ethyl 2-hydroxyethylthiolcarbonate were refluxed under aspirator vacuum for 60 hours. Distillation gave 174 g. (84 percent) of I.

*Example 10*

Uranium acetate 0.0375 g. (Baker and Adamson No. 2404) and 103 g. (0.5 mole) of n-hexyl 2-hydroxyethylthiolcarbonate were refluxed for 6 hours under aspirator vacuum. Distillation gave 31 g. (57 percent) of I.

*Example 11*

Calcium acetate, 0.03 g. (Baker and Adamson No. 1500) and phenyl 2-hydroxyethylthiolcarbonate 98 g. (0.5 mole) (see reference Example 2) were refluxed under aspirator vacuum for 5 hours. Distillation gave 26 g. (49 percent) of I.

*Example 12*

Yttrium nitrate, 0.8 g., and 300 g. (2.0 moles) of ethyl 2-hydroxyethylthiolcarbonate were refluxed under aspirator vacuum for 21 hours. Distillation gave 176 g. (85 percent) of I.

*Example 13*

Lanthanum nitrate, 0.87 g. (Lindsay Chemicals Division, American Potash and Chemicals Co., Code 548) and 300 g. (2.0 moles) of ethyl 2-hydroxyethylthiolcarbonate were refluxed under aspirator vacuum for 16 hours. Distillation gave 155 g. (75 percent) of I.

*Example 14*

Thorium nitrate, 0.011 g. (Pfaltz and Bauer, Inc.), ad 300 g. (2.0 moles) of ethyl 2-hydroxyethylthiolcarbonate were refluxed for 23 hours under aspirator vacuum. Distillation gave 186 g. (90 percent) of I.

*Example 15*

Thorium nitrate, 0.011 g., and 300 g. (2.0 moles) of ethyl 2-mercaptoethylcarbonate (IV) (purchased from Eastman Organic Chemicals No. 8311) were refluxed for 27 hours under aspirator vacuum. Distillation gave 194 g. (93.5 percent) of I.

*Example 16*

Thorium nitrate (0.11 g.) and 300 g. (2.0 moles) of ethyl 2-hydroxyethylthiolcarbonate were heated for 48 hours on a steam bath (ca. 95°). Distillation at the end of this time gave 42 g. (20 percent) of I.

*Example 17*

Uranyl nitrate, 0.25 g. and 300 g. (2.0 moles) ethyl 2-mercaptoethylcarbonate (IV) (Eastman Organic Chemical No. 8311) were refluxed 24 hours under aspirator vacuum. Distillation gave 185 g. (89 percent) of ethylene monothiolcarbonate (I).

The examples show that the catalyst level, the temperature and the degree of vacuum are not critical, but are interdependent. In the laboratory the vacuum source tends to form the basis of the system, and the temperature required to volatilize the by-product and the catalyst level have followed from this basis. For convenience in our work, the vacuum source was a water aspirator, although any means of reducing the pressure would be suitable. The quantity of catalyst required to give the conversions described in a convenient period of time was 0.0005 to 1.0 molar percent, however, for other conditions lower or higher molar ratios can be used. The optimum catalyst range was .0005 to 0.500 molar percent. Illustrative of this lack of critical catalyst level was a series run with thorium nitrate in which variation from 0.1 molar percent to 0.001 molar percent respectively. Example 16 illustrates that the degree of vacuum is not critical in that II and a catalyst salt were heated on a steam bath at atmospheric pressure and I was isolated by distillation.

The preparation of I can be further simplified with commensurate reduction in purification loss by eliminating the distillation when the catalyst is not detrimental to subsequent reactions. In an experiment like Example 14, only 0.0005 molar percent of catalyst was in each mole of I before distillation and a yield of 97 percent of I.

The invention has been described in detail with particular reference to preferred embodiments thereof, but it will be understood that variations and modifications can be effected within the spirit and scope of the invention as described hereinabove and as defined in the appended claims.

We claim:

1. A process for preparing ethylene monothiolcarbonate which comprises heating a R-2-hydroxyethylthiolcarbonate in which R is a hydrocarbon group selected from the class consisting of alkyl radicals having 1–6 carbon atoms, aryl radicals and substituted aryl radicals in the presence of a metal salt catalyst of the formula $M_aY_b$, wherein M is chosen from the group consisting of aluminum, the metals of group IIIB and IVB of the periodic table, the lanthanides and the actinides, Y is chosen from the group consisting of acetate, alkoxide, halide and nitrate and $a$ and $b$ are integers corresponding to balanced valences.

2. A process for preparing ethylene monothiolcarbonate which comprises heating methyl 2-hydroxyethylthiolcarbonate in the presence of a metal salt catalyst of the formula $M_aY_b$, wherein M is chosen from the group consisting of aluminum, the metals of group IIIB and IVB of the periodic table, the lanthanides and the actinides, Y is chosen from the group consisting of acetate, alkoxide, halide and nitrate and $a$ and $b$ are integers corresponding to balanced valences.

3. A process for preparing ethylene monothiolcarbonate which comprises heating ethyl 2-hydroxyethylthiolcarbonate in the presence of a metal salt catalyst of the formula $M_aY_b$, wherein M is chosen from the group consisting of aluminum, the metals of group IIIB and IVB of the periodic table, the lanthanides and the actinides, Y is chosen from the group consisting of acetate, alkoxide, halide and nitrate and $a$ and $b$ are integers corresponding to balanced valences.

4. A process for preparing ethylene monothiolcarbonate which comprises heating hexyl 2-hydroxyethylthiolcarbonate in the presence of a metal salt catalyst of the formula $M_aY_b$, wherein M is chosen from the group consisting of aluminum, the metals of group IIIB and IVB of the periodic table, the lanthanides and the actinides, Y is chosen from the group consisting of acetate, alkoxide, halide and nitrate and $a$ and $b$ are integers corresponding to balanced valences.

5. A process for preparing ethylene monothiolcarbonate which comprises heating phenyl 2-hydroxyethylthiolcarbonate in the presence of a metal salt catalyst of the formula $M_aY_b$, wherein M is chosen from the group consisting of aluminum, the metals of group IIIB and IVB of the periodic table, the lanthanides and the actinides, Y is chosen from the group consisting of acetate, alkoxide, halide and nitrate and $a$ and $b$ are integers corresponding to balanced valences.

6. A process for preparing ethylene monothiolcarbonate which comprises heating a compound selected from the class consisting of R-2-hydroxyethylthiolcarbonates and R-2-mercaptoethylcarbonates in which R is a hydrocarbon group is selected from the class consisting of alkyl radicals having 1–6 carbon atoms, aryl radicals, and substituted aryl radicals under reduced pressure in the presence of a metal salt catalyst of the formula $M_aY_b$, wherein M is chosen from the group consisting of aluminum, the metals of group IIIB and IVB of the periodic table, the lanthanides and the actinides, Y is chosen from the group consisting of acetate, alkoxide, halide and nitrate and $a$ and $b$ are integers corresponding to balanced valences, with the continuous removal of the resulting hydroxy compound and the decomposition products.

7. A process for preparing ethylene monothiolcarbonate which comprises heating methyl 2-hydroxyethylthiolcarbonate in the presence of basic aluminum acetate with the continuous removal of methanol, carbon dioxide and ethylene sulfide.

8. A process for preparing ethylene monothiolcarbonate which comprises heating ethyl 2-hydroxyethylthiolcarbonate in the presence of basic aluminum acetate with the continuous removal of ethanol, carbon dioxide and ethylene sulfide.

9. A process for preparing ethylene monothiolcarbonate which comprises heating hexyl 2-hydroxyethylthiolcarbonate in the presence of basic aluminum acetate with the continuous removal of hexanol, carbon dioxide and ethylene sulfide.

10. A process for preparing ethylene monotholcarbonate which comprises heating ethyl 2-mercaptoethylcarbonate under reduced pressure in the presence of uranyl nitrate.

11. A process for preparing ethylene monothiolcarbonate which comprises heating ethyl 2-mercaptoethylcarbonate in the presence of thorium nitrate under reduced pressure.

12. A process for preparing ethylene monothiolcarbonate which comprises heating ethyl 2-hydroxyethylthiolcarbonate in the presence of thorium nitrate under reduced pressure.

References Cited by the Examiner

UNITED STATES PATENTS 3,072,676  1/63  Johnson et al. _____ 260—327

IRVING MARCUS, *Primary Examiner.*

NICHOLAS S. RIZZO, WALTER A. MODANCE,
*Examiners.*